June 25, 1929.  L. B. GRAHAM  1,718,289
SPRING MOTOR
Filed Aug. 21, 1925   2 Sheets-Sheet 1
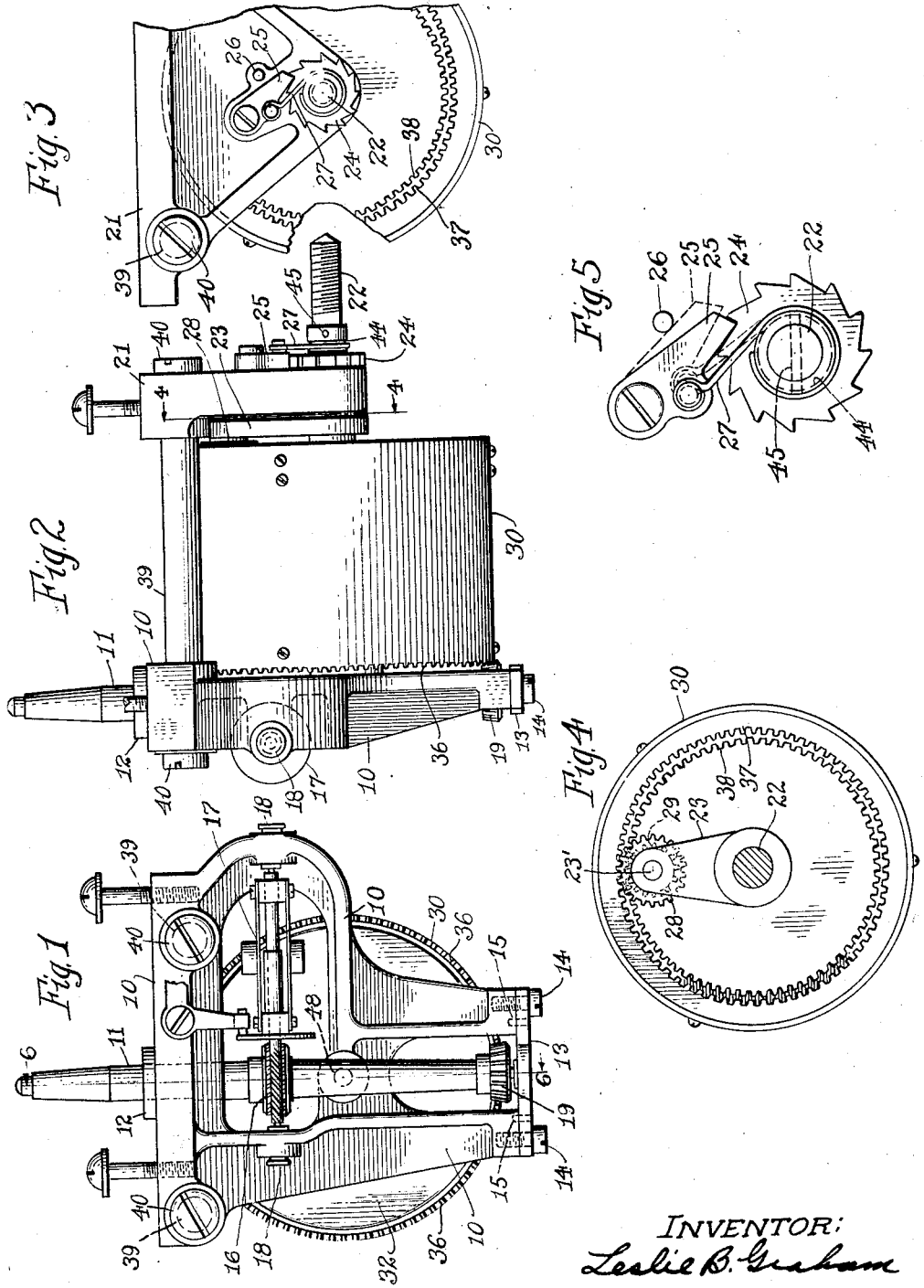
INVENTOR:
Leslie B. Graham

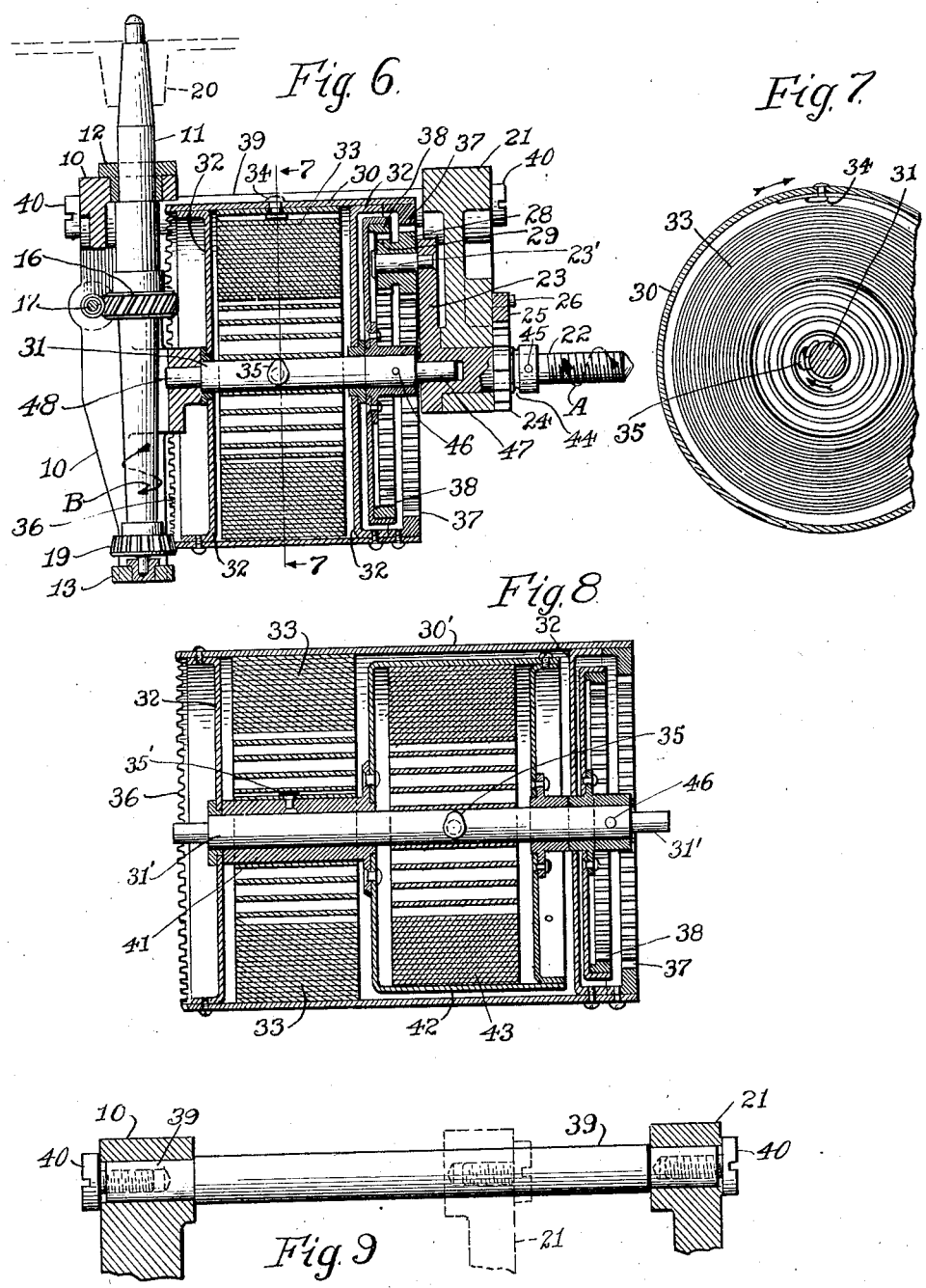

Patented June 25, 1929.

1,718,289

UNITED STATES PATENT OFFICE.

LESLIE B. GRAHAM, OF EAST CHICAGO, INDIANA.

SPRING MOTOR.

Application filed August 21, 1925. Serial No. 51,668.

In the manfacture of spring motors it is the usual practice to interpose the power spring between a train of gears consisting of two or three reductions for the purpose of transmitting its power, and another train of gears known as the winding train. These two separate trains heretofore have been used independently of each other and for their express purpose, that is, one train for winding only and the other train for the transmission of power only. The present invention provides means for utilizing of both trains in the transmission of power thereby affording a reduction in parts constituting the gear train for attaining high ratios between each turn of the springs unwinding and the revolutions of the power delivery shaft, together with compactness of design and simplicity of construction; and further advantages that will be pointed out in the rest of the specifications and the objects, which are—

First: To provide simple means of construction in spring motors whereby the frame or housing members together with other parts will be of uniform size or form and adaptable in the assembly of different powered motors having one or more springs without change in size or form of the various parts.

Second: To provide a spring motor wherein the winding gear and transmission gear together will be utilized in the transmission of power.

Third: To provide means for increasing the efficiency of spring motors by utilizing the excessive torque stored up in the spring's charge above that necessary to actuate the moving parts and the load.

Fourth: To provide means in a spring motor whereby the power delivery shaft will be driven directly of the spring barrel by one reduction of spur or bevel gearing without the use of intermediate gears and relative parts.

Fifth: To provide means in a spring motor for eliminating unnecessary strains and friction set up in the various bearings and gear contacting faces due to the excessive torque charged within the spring.

I attain the above objects by the construction shown within the drawings and as disclosed in the rest of the specification.

Figure 1 is an end view of my spring motor showing the end frame, governor mechanism, power delivery or turntable shaft and the driving end of the spring barrel.

Figure 2 is a side view of the motor showing the two end frames with their spacing rods, the spring barrel, driving gears and winding mechanism.

Figure 3 is an end view showing the rear end frame, winding gears and silent ratchet winding mechanism.

Figure 4 is a face view of the winding gears with the winding arm in section and taken on line 4, 4, of Fig. 2.

Figure 5 is an enlarged face view of the ratchet mechanism showing the action of the ratchet pawl and shifting spring by the dotted lines.

Figure 6 is a sectional view of the entire motor taken on line 6, 6, of Fig. 1.

Figure 7 is a sectional view of the spring barrel taken on line 7, 7, of Fig. 6; and showing the direction of spiral of the spring in relation to winding and release of its power as indicated by the arrows.

Figure 8 is a sectional view of the spring barrel for inclosing two springs and showing the method of adding one or more springs.

Figure 9 is a side view showing the method of extending the end frames for the purpose of adding more than one spring.

Heretofore it has been the common practice in the manufacture of spring motors to provide a specially constructed frame or housing for each size motor having one or more springs, also, usually requiring changes in various other parts and entailing a large number of special tools and equipment for the manufacture and carrying on hand numerous particular parts for each size motor.

I overcome these objectional features and provide a ready means of interchange of parts for the assembling of different size motors by assembling various parts into assembly units and then in turn assembling these units into a complete motor; that is, the spring barrel and its relative parts will consist of an assembly unit and the two end frames each supporting their relative parts will form assembly units. These assembly units are disclosed in the drawings as follows—

The frame 10 supports the turntable shaft 11 near its upper end as at 12 and at its lower end in the bearing plate 13, which is secured the frame 10 by means of the screws 14 and dowel pins 15. Upon the shaft 11 is mounted the usual spiral gear 16 for actuating the governor 17 which is supported in the frame 10 as at 18; and at the lower end of the shaft 11 is secured the pinion 19 for receiving power from the spring for operating the turntable 20, Fig. 6. This group as described consists of one end frame assembly unit.

The rear frame 21 supporting the wind shaft 22, pinion arm 23, and ratchet wheel 24 together with pawl 25, stop pin 26 and pawl throw-out spring 27, and the pinion gears 28, 29, form another end frame assembly unit.

The spring barrel 30 supported upon the shaft 31 by its end members 32 and freely rotating thereon enclose the power spring 33 secured at its outer end to the barrel 30, as shown at 34, and at its inner end to the shaft 31 as shown at 35; and one end of the barrel 30 having the gear teeth 36 cut therein for the purpose of engaging the pinion 19 while at its other end is secured the internal gear 37 which is turn engages pinion 28; and the shaft 31 mounted to rotate freely in the end frames as at 47 and 48 has secured to it the internal gear 38 engaging with the pinion 29. These parts, except the pinions 28, 29, consist of the third assembly unit, and by the combination of these assembled units a completed motor is formed and secured together by the spacing rods 39 which in turn are securely held in the end frames 10 and 21 by the screws 40.

Figure 8, shows a means for adding springs to the power unit consisting of the barrel 30' of a length to enclose two springs as shown. The spring 33 in this case is secured to the sleeve 41 instead of the shaft 31'; and the second spring barrel 42 is secured to the sleeve 41 and contains the second spring 43 the inner end of which is secured to the shaft 31' and its outer end to the barrel 42. To the winding end of the barrel 30' the internal gear 37 is secured in the same manner as shown in Fig. 6, and mounted upon the shaft 31' the internal gear 38 is attached as at 46.

For the purpose of utilizing all of the gears embodied within the construction for developing high ratio in revolutions of the turntable shaft 11 to each turn of unwinding of the spring, I make use of the novel means shown in Fig. 6; the parts 22, 23, 23', 28, 29, 37 and 38, provide means for rewinding and also means for including these gears in the transmission of power to the shaft 11. This feature I claim to be new and novel and the most important in the present invention as it affords advantages over my other patents allowed and pending and which I believe to be new in the art of spring powered motors. It further provides means for developing high ratios within a more compact space together with a much smoother running train of gears, due to the fact, that the internal gears with the particular arrangement of their pinions have a more constant velocity ratio at the pitch line than spur gear type.

Operation of the motor is as follows:—In charging of the power spring or springs the usual winding crank (not shown) is attached to the shaft 22 and turned in the direction indicated by the arrow "A" Fig. 6, this turning causes the arm 23 to rotate in the same direction rotating the stud shaft 23' in a circular path within the internal gears 37 and 38, and as pinions 28 and 29 are secured rigidly together and mounted to rotate freely upon the stud shaft 23' these pinions will also describe a circular path with the stud shaft 23'; the turntable shaft 11 being held stationary by the usual brake (not shown) and likewise the barrel 30, the internal gear 37 can not rotate and the pinions 28, 29 will be caused to rotate in counter direction to that of the arm 23 upon the stud shaft 23' while being carried with it in describing the circular path. Internal gears 37 and 38 are of a different diameter at their pitch line, gear 38 being the smaller and free to rotate a motion to 38 will be set up in the same direction about its axis as the arm 23 due to the leverage effect of the pinions 28, 29 acting upon the interal gears; gear 37 acting as a fulcrum, stud 23' as the force and internal gear 38 as the weight to be moved; the spring will be caused to wind up at its inner end as shown by the arrow at 35.

This ratio of winding of the spring as disclosed by the drawings is five to one, the winding crank making five turns to one turn of the springs winding up, different ratios may be used if desired for winding by increasing or decreasing the difference in the size of the internal gears 37, 38 together with a corresponding change in size of the pinions 28, 29; but, any change of this ratio will also effect a corresponding change in the transmission train of gears in driving the shaft 11.

At the start of rotating the shaft 22, during winding, the friction spring 27 of the silent winding ratchet mechanism, Fig. 5 will cause the pawl 25 to shift out to the stop pin 26 due to the friction of spring 27 in the groove 44 of the hub of ratchet wheel 24, which is secured to the shaft 22 by means of the pin or key 45, and will remain out of engagement with the ratchet wheel until a reverse motion of the shaft 22 is set up by the spring's power upon release of the winding crank when it will reengage the ratchet wheel, and stop further unwinding of the spring.

During the operation for the release of power from the power spring the shaft 11 will be rotated in the direction shown by the arrow "B" Fig. 6, driving the governor 17 and turntable receiving power through the barrel 30, teeth 36 and the pinion 19. As the spring barrel 30 rotates it will also rotate internal gear 37, and pinion 28 meshing with 37, will be rotated upon the stud 23' in the same direction causing pinion 29 to rotate driving internal gear 38 to rotate as in winding of the spring, and which will cause a partial winding of the spring by its own power during release of its power; thus utilizing the winding gears as a part of the transmission gears in the transmission of power. This arrangement permits the use of a much larger pinion gear, as at 19, than heretofore and thereby greatly reducing the leverage in overcoming work placed upon the shaft 11; and by the use of a larger pinion a much sturdier construction, more silent and smoother operation will be attained than heretofore in the art. Heretofore it has been the practice in order to keep the mechanism in a compact form and still attain high ratios to use pinions upon the turntable shaft of from five-sixteenths to three-eighths of an inch in diameter at their pitch line; while in my invention I still attain high ratios with the large pinion and maintain the compactness.

A further novel feature of the present invention is the approximately ninety to ninety-five per cent of the friction upon the gears contacting faces and friction and strains set up in the bearings of the shafts heretofore is eliminated by the present invention, due to the greater portion of the spring's power being held in check by the particular arrangement of the internal gears and their pinions, in preventing the excessive torque of the spring acting upon and throughout the transmission train of gears.

By the ratios shown only five per cent of the total torque is allowed to escape while the transmission train of gears are in action; producing a much longer time of actuation before the spring has completely unwound. This action will be more clearly understood by the following—Assume that only two turns of the spring is required to store up enough torque to operate the transmission gears and the load, then if it was possible to wind up the other turns of the spring without creating excessive torque the spring would, under release of power, operate the mechanism equally as efficient. This is not only accomplished in the present invention, but, I further convert this excessive torque into power and distribute it over a much longer running time for operation of the mechanism. By the present invention efficiency of from fifty to two hundred per cent increase, or more, may be obtained over motors having their springs fixed at one end while the other end expends power as heretofore.

The ratio of the spring barrel in revolutions to one turn of the spring's unwinding, as disclosed in the present invention, is 20 to 1, and the ratio of the shaft 11 to that of the spring barrel is 5 to 1 making a total of one hundred revolutions of the shaft 11 to one turn of unwinding of the spring, and much higher ratios than this are possible where light loads are required to be operated such as the operating of clocks and time recording devices, window display stands, electric time switches and the like.

I do not confine my invention to the particular construction shown and disclosed in the drawings as slight changes may be made without departing from my claims, and other modifications in the gearing may be resorted to.

Having disclosed my invention in the drawings and specifications what I claim is—

1. In the combination of a spring motor, a spring actuating a transmission shaft and a gear mounted thereon and a second gear at one of the ends of said spring, a gear connected to the other end of said spring, a pair of pinion gears rigidly secured together and mounted to rotate freely upon a stud shaft carried by a rotatable arm, said pinions being actuated by one of said gears connected to one end of said spring, and the other of said gears being actuated by the other of said pinions for the purpose of partially winding said spring by its own torque, and means for holding said rotatable arm stationary during release of the spring's power.

2. In the combination of a spring motor, a spring actuating a train of transmission gears and an internal gear at one of its ends, a second internal gear connected to the other end of said spring, a pair of pinion gears rigidly secured together and mounted to rotate freely upon a stud shaft carried by a rotatable arm, one of said pinion gears meshing with one of said internal gears connected to one end of the spring, and the other of said pinion gears meshing with other of said internal gears connected to the other end of the spring, means for actuating said rotatable arm for the purpose of winding the spring, and means for utilizing all of said gears in the transmission of power.

3. In the combination of a spring motor, an end frame embracing a transmission shaft and governor mechanism, a second end frame embracing a spring winding mechanism, a spring barrel enclosing one or more power springs, a gear formed thereon one end of said barrel and a second gear attached to the other end of said barrel, one end of said spring or springs being secured to the said barrel and the other end of spring or springs having a gear attached thereto, said barrel and its relative elements and each of said end frames and their relative elements forming three distinct assembly units, and means for combining these assembly units into general assembly of a completed motor as shown and for the purpose specified.

4. In the combination of a spring motor, means for transmission of spring power to a power delivery shaft, a gear actuated by one end of a spring and a second gear actuating the other end of the spring, a pair of pinion gears rigidly secured together, one of said pinion gears meshing with the gear actuated by the spring and the other of said pinion gears meshing with the gear actuating the other end of the spring, a means for winding said spring by rotation of said pinion gears in a planetary motion about the axis of said gears, and a means for holding said pinion gears inactive as to said planetary motion during escapement of said spring power.

5. In combination of a spring motor, a spring actuating a power delivery means and a gear attached to the power delivery end of the spring, a second gear for actuating the other end of the spring and mounted to rotate on the axis of the gear attached to the power delivery end of the spring, a pair of pinion gears rigidly secured together and meshing with both of said gears and mounted to be rotated in a planetary motion during winding of said spring, a means for actuating said pinion gears in said planetary motion, and a means for holding said pinion gears inactive of said planetary motion during release of said spring power.

6. In the combination of a spring motor, a spring, a pair of gears, a pair of pinion gears rigidly secured together, a member for actuating said pinion gears in a planetary motion about the axis of said pair of gears during winding of said spring, and a means for holding said pinion gears inactive as to said planetary motion during release of power from said spring.

7. In the combination of a spring motor, a spring power source, a pair of gears, a pair of pinion gears meshing with said pair of gears and adapted to be rotated in a planetary motion about the axis of said pair of gears, a means for rotating said pinion gears in said planetary motion for winding said spring power source, and means for holding said pinion gears inactive as to said planetary motion during escapement of said spring power source.

8. In the combination of a prime mover, a pair of gears, a pair of pinion gears meshing with said pair of gears and mounted to rotate in a planetary motion about the axis of said pair of gears, a power source interposed between said pair of gears, means for rotating said pinion gears in said planetary motion, and means for holding said pinion gears inactive of said planetary motion during escapment of power from said power source for the purpose of prolonging escapement of said power source.

9. In the combination of a spring motor, a spring actuating a power transmission shaft and an internal gear at one of its ends, a second internal gear connected to the other end of the spring, a pair of pinion gears rigidly secured together and mounted to rotate freely upon a stud shaft carried by a rotatable arm, one of said pinion gears meshing with one of said internal gears connected to one end of the spring, and the other of said pinion gears meshing with the other of said internal gears connected to the other end of said spring, one of said internal gears having a larger diameter than the other of said internal gears, and one of said pinion gears having a larger diameter than the other of said pinion gears, the smaller of said pinion gears meshing with the larger of said internal gears and the larger of said pinion gears meshing the smaller of said internal gears, a means for actuating said rotatable arm for the purpose of winding said spring, and means for utilizing all of said gears in the transmission of power through the power transmission shaft.

In testimony whereof I affix my signature.

LESLIE B. GRAHAM.